(12) United States Patent
Chaillou et al.

(10) Patent No.: US 10,840,749 B2
(45) Date of Patent: Nov. 17, 2020

(54) ROTARY ELECTRIC MACHINE STATOR HAVING DEFORMED TEETH AND A PLURALITY OF BOSSES TO SECURE WINDINGS

(71) Applicant: Valeo Equipements Electriques Moteur, Creteil (FR)

(72) Inventors: Jimmy Chaillou, Etaples-sur-Mer (FR); Pierre-Yves Bilteryst, Etaples-sur-Mer (FR); Henri Delianne, Etaples-sur-Mer (FR); David Margueritte, Etaples-sur-Mer (FR); Eric Jozefowiez, Etaples-sur-Mer (FR); Sylvain Perreaut, Etaples-sur-Mer (FR); Mohamed El-Ghazal, Etaples-sur-Mer (FR)

(73) Assignee: Valeo Equipements Electriques Moteur, Creteil (FR)

( * ) Notice: Subject to any disclaimer, the term of this patent is extended or adjusted under 35 U.S.C. 154(b) by 55 days.

(21) Appl. No.: 15/894,299

(22) Filed: Feb. 12, 2018

(65) Prior Publication Data

US 2018/0233969 A1 Aug. 16, 2018

(30) Foreign Application Priority Data

Feb. 13, 2017 (FR) ..................................... 17 51140

(51) Int. Cl.
*H02K 1/16* (2006.01)
*H02K 3/493* (2006.01)
(Continued)

(52) U.S. Cl.
CPC .............. *H02K 1/165* (2013.01); *H02K 3/12* (2013.01); *H02K 3/345* (2013.01); *H02K 3/493* (2013.01);
(Continued)

(58) Field of Classification Search
CPC .......... H02K 1/165; H02K 3/12; H02K 3/345; H02K 3/493; H02K 15/0018; H02K 15/024; H02K 15/085; H02K 15/10
(Continued)

(56) References Cited

U.S. PATENT DOCUMENTS 6,002,219 A 12/1999 Permuy
6,822,364 B2 * 11/2004 Suzuki .................. H02K 1/185
310/216.012
(Continued)

FOREIGN PATENT DOCUMENTS

EP 0235597 A2 9/1987
EP 0297278 A2 1/1989
(Continued)

OTHER PUBLICATIONS

Preliminary Search Report issued in corresponding French Application No. 1751140, dated Oct. 3, 2017 (2 pages).

*Primary Examiner* — Tulsidas C Patel
*Assistant Examiner* — Rashad H Johnson
(74) *Attorney, Agent, or Firm* — Osha Bergman Watanabe & Burton LLP (57) ABSTRACT

A rotary electric machine stator (2) includes a stator body (20) and a stator winding (22) supported by the stator body (20), in which the stator body extends around an axis (X) while being delimited by an internal radial surface (3) and an external radial surface (4), said stator bodies having a plurality of teeth (6) formed respectively between two slots (5) arranged in said stator body from the internal radial surface and extending axially to receive at least one stator winding element (22).

The stator has at least one deformed tooth (6) which comprises, at its loose end (7) helping to define the internal radial surface, at least one protrusion (10) extending across an (Continued)

adjacent slot, said protrusion (10) being obtained by material deformation of said deformed tooth (6).

13 Claims, 6 Drawing Sheets

(51) Int. Cl.
    *H02K 15/00*     (2006.01)
    *H02K 3/12*     (2006.01)
    *H02K 3/34*     (2006.01)
    *H02K 15/02*     (2006.01)
    *H02K 15/085*     (2006.01)
    *H02K 15/10*     (2006.01)

(52) U.S. Cl.
    CPC ....... *H02K 15/0018* (2013.01); *H02K 15/024* (2013.01); *H02K 15/085* (2013.01); *H02K 15/10* (2013.01)

(58) Field of Classification Search
    USPC .................................................. 310/216.049
    See application file for complete search history.

(56) References Cited

U.S. PATENT DOCUMENTS

| | | | |
|---|---|---|---|
| 2004/0263018 A1 | 12/2004 | Arendes et al. | |
| 2005/0046299 A1* | 3/2005 | Brown | H02K 3/493 310/207 |
| 2005/0062359 A1* | 3/2005 | Neet | H02K 3/493 310/214 |
| 2006/0290225 A1* | 12/2006 | Mipo | H02K 1/16 310/187 |
| 2008/0224563 A1* | 9/2008 | Chochoy | H02K 3/12 310/254.1 |
| 2009/0066183 A1* | 3/2009 | Aramaki | H02K 15/022 310/216.008 |
| 2009/0189474 A1* | 7/2009 | van Heyden | H02K 3/522 310/195 |
| 2015/0001984 A1 | 1/2015 | Bradfield | |
| 2017/0047807 A1* | 2/2017 | Manz | H02K 3/345 |
| 2018/0115202 A1* | 4/2018 | Hirotani | H02K 1/16 |

FOREIGN PATENT DOCUMENTS

| | | |
|---|---|---|
| EP | 1463184 A2 | 9/2004 |
| EP | 1763919 A1 | 3/2007 |
| FR | 2745445 A1 | 8/1997 |

* cited by examiner

ROTARY ELECTRIC MACHINE STATOR HAVING DEFORMED TEETH AND A PLURALITY OF BOSSES TO SECURE WINDINGS

The present invention relates to the field of rotary electric machines and more particularly to the design of a stator for such a rotary electric machine.

It is known to use rotary electric machines in motor vehicles. It can in particular be a question of a polyphase alternator, configured to convert mechanical energy into electrical energy and conversely. Such a reversible alternator is known as an alternator-starter and in one type of operation enables the mechanical energy generated when the vehicle is operated to be used to re-charge a battery of this vehicle and in another type of operation to supply mechanical energy in particular to start the thermal engine of the vehicle.

This machine mainly comprises a casing and, inside the latter, a rotor, spinning integrally with a shaft, and a stator, which surrounds the rotor with presence of a small air-gap and which comprises a body equipped with slots for assembling the phases of the stator. The stator can thus be described as comprising a stator body and a stator winding mounted on the stator body. The stator body has an alternation of teeth and slots, each slot providing the housing of at least one winding around a tooth. Windings are obtained for example from a continuous wire, traditionally covered with insulation.

These polyphase windings for example are star- or delta-connected three-phase windings, whose outputs are joined to at least one rectifying bridge comprising rectifying elements such as diodes or MOSFET-type transistors, in particular when it concerns an alternator-starter as described for example in document FR A 2 745 445 (U.S. Pat. No. 6,002,219).

The winding of the wires around the teeth of the stator body can have a drawback insofar as the winding cannot be securely fixed in the slots and can come out of the space defined by the stator body, i.e. surpass the internal diameter of the stator, which causes a risk of collision with the rotor spinning inside the stator body.

It is known to produce the stator body from a stack or core of laminations, each lamination formed with alternating teeth and slots, the axial dimension of those in the stator body being created by the stack of laminations. In order to solve the previously cited problem of the winding coming out of the stator, it is known to produce the specific shapes of the laminations by cutting the loose end of the teeth, i.e. their end facing the interior of the stator, so that they have protrusions which partially extend across the slots disposed on either side of this tooth. The stack of laminations then generates the formation of a protrusion extending axially and reducing the passage section for the wire of the winding inserted into the slot, so that once inserted into the slot by force, the stator winding can no longer come out of it while the engine is operating.

It is however understood that such a design requires the wires of the stator winding to be inserted into the slot with force, which risks damaging the structure of the stator winding wire or removing all or part of the insulation layer surrounding this wire.

Thus there was need for a design in which the teeth do not have roots, i.e. any protrusions. In order to prevent the wire coming out of the slot, document U.S. Pat. No. 7,808,148 teaches that the wire is crushed radially in order to increase its orthoradial width so that it lies against the edges of the slot. But as previously, the wire and its insulation are likely to be damaged during this operation.

The present invention falls under this context and aims at proposing an electric machine wherein the stator winding can be correctly disposed on the body stator, without damage to the latter, while ensuring it is held tightly in the allocated space while the engine is operating.

The object of this invention is a rotary electric machine stator comprising a stator body and a stator winding supported by the stator body. The stator body extends around an axis (X) and is delimited by an internal radial surface and an external radial surface. It also has a plurality of teeth formed respectively between two slots arranged in said stator body from the internal radial surface and extending axially to receive at least one element of the stator winding, so that the latter has alternating slots and teeth along the circumference of the stator. The dimension between two successive slots surrounding each tooth is defined as the thickness of the tooth.

According to the invention, the stator body has at least one deformed tooth which comprises, at its loose end helping to define the internal radial surface of the stator, at least one protrusion extending across an adjacent slot. The protrusion is obtained by material deformation of said deformed tooth.

The at least one protrusion can be formed by a bead resulting from displacement of material and, more precisely, by displacement of material from the external radial surface of the stator towards the internal radial surface of said stator.

According to a feature of the invention, the loose end of the deformed tooth can comprise a protrusion extending on either side of the tooth, across each directly adjacent slot of said deformed tooth, thus enabling the winding elements of the stator wound around this tooth to be secured and extending in the directly adjacent slots on either side of the tooth.

The loose end of the deformed tooth can have, on the internal radial surface of the stator, a furrow forming a point-like or straight entry, centred in relation to the thickness of the tooth.

Protrusions can be present on all the teeth of the stator. They are obtained by radial deformation of the teeth and can have different heights in the same slot. In other words, each tooth can be a deformed tooth which comprises, at its loose end, at least one protrusion obtained by radial deformation of the stator. And two successive teeth can have protrusions arranged at different axial positions along the circumference of the stator. Thus two protrusions of two successive teeth can face one another in the same slot on different axial levels enabling the winding elements of the stator to be secured more effectively.

In the radial prolongation of the deformed teeth, the external radial surface of the stator has a crushed boss resulting from carrying out the process allowing displacement of material at the root of the protrusions present on said deformed teeth.

The body of the stator can be formed by an axial stack of laminations over each other so as to form a core of laminations. These laminations are arranged so that at least one projecting boss protruding from the external wall of said core of laminations appears. This external wall will correspond, after formation of the body of the stator, to the external radial surface of the latter.

This boss can extend axially over a defined number of laminations of the core of laminations. Thus it can extend over the total height of the laminated core or, preferably, only over a portion of this axis, thus allowing the arrangement of the protrusions next to the same slots at different axial levels. This staggered arrangement of the protrusions will allow better retention of the winding elements of the stator. In such a core of laminations, i.e. before deformation of material, the teeth arranged in the radial prolongation of each boss are straight and have, opposite the bosses, regular loose ends, i.e. no protrusion.

The invention also relates to tooling, allowing a stator to be obtained by deformation of the core of laminations as described above. This tooling comprises an internal tool brought into contact with the loose ends of the teeth of at least one lamination of the core of laminations and an external tool brought into contact with the external wall of at least one lamination of the core of laminations.

The internal tool can have at least one point, so that this point is in contact with a loose end of a tooth of a lamination of the core of laminations. The external tool, in its case, can have a regular profile, configured to systematically lie on the circumference of the core of laminations and on at least one boss.

In order to obtain the stator as described a first stage, consisting of inserting the winding elements of the stator into the slots formed by the arrangement of the core of laminations, is carried out then a later stage, consisting of deforming material of the core of laminations by pressure of at least one boss at the level of the external wall of the core of laminations, via the external tool, while the elements of the stator winding are placed in their respective slots so as to create a protrusion, at the opposite end, across at least part of the slot along the tooth.

The deformation stage in particular can be divided into at least two stages. A stage of positioning the tools, and in particular an internal tool against the loose end of the teeth and an external tool on the circumference of the external radial surface, and a stage of moving the external tool against the external wall of the core of laminations in the direction of the still fixed internal tool. The movement of this external tool towards the fixed internal tool allows displacement of material from the external radial surface of the stator towards the internal radial surface of said stator, entailing deformation of the tooth and thus creating the protrusions enabling the winding elements of the stator to be finally secured.

It will also be possible to apply an electric insulation member against the body of the stator before inserting the winding element(s) into the body of the stator.

This stator, for example, can be installed in a rotary electric machine.

Other features, details and advantages of this invention will become clearer on reading the detailed description given below by way of indication, with reference to the various exemplary embodiments of the invention illustrated in the following figures:

The embodiments which are described below are by no means restrictive; in particular it is possible to imagine alternatives of the invention comprising only one selection of features described below, isolated from the other described features, if this selection of features is sufficient to bestow a technical advantage or demarcate the invention from the prior art.

Figure 1:
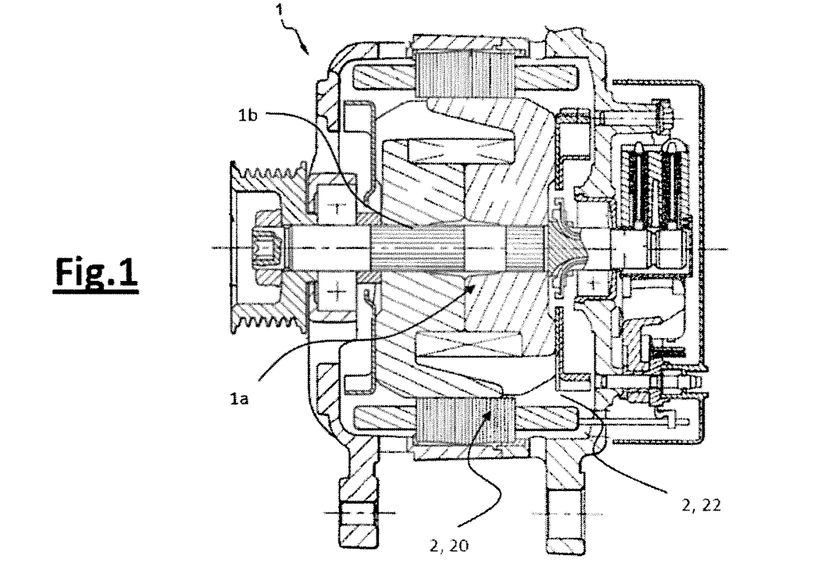
FIG. 1 is an illustration of a rotary electric machine comprising at least one stator according to a traditional embodiment.

FIG. 1 schematically illustrates a rotary electric machine 1, comprising a stator 2, integral with a casing of the machine, and an internal rotor 1a placed inside stator 2 and supporting a driving shaft 1b. Stator 2 comprises a stator body 20 and a stator winding 22, configured and connected electrically to interact with permanent magnets or field windings, such as illustrated, associated here with the rotor.

Figure 2:
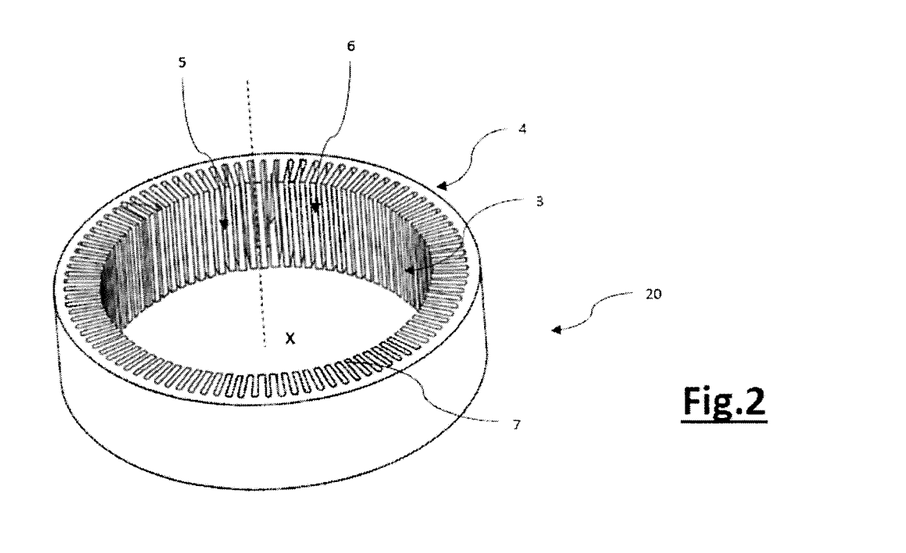
FIG. 2 is a perspective view of a stator body according to a traditional embodiment, FIG. 3 schematically partially illustrates an inventive stator, in a plane perpendicular to the rotational axis of the stator, after carrying out the process of deformation of the teeth entailing the formation of protrusions at their loose ends.

FIG. 2 shows a perspective view of a stator body 20 according to a traditional embodiment. Stator body 20 has an annular shape having a rotational axis X. It comprises an internal radial surface 3 and an external radial surface 4. External radial surface 4 has a continuous, regular and smooth form, while internal radial surface 3 has a discontinuous form with slots 5 which extend radially from internal radial surface 3 in the thickness of stator body 20. This results, on internal radial surface 3 of stator body 20, in an alternation of these slots 5 and teeth 6 formed by material remaining between slots 5. Radial surface internal 3 is thus defined by the alternation of loose ends 7 of teeth 6 and slots 5. The dimension between two successive slots 5 surrounding each tooth 6 is defined as the thickness of the tooth.

Figure 3:
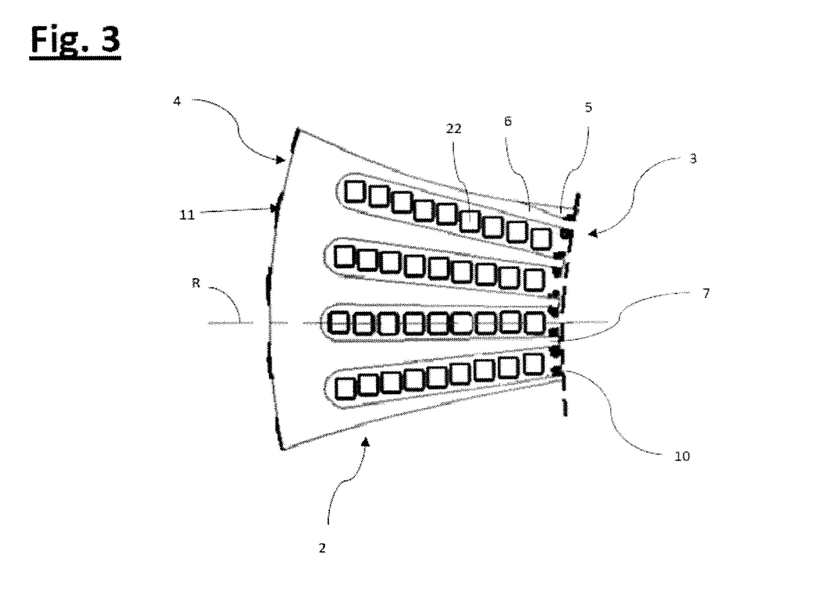

Inventive stator 2 will now be described as illustrated in FIG. 3, where in particular a stator winding 22, which is wound around the teeth while placed in slots 5, is shown. Stator 2 is composed of stator body 20 and stator winding 22, wound around teeth 6 formed in stator body 20. As will be described in more detail below, the invention aims at deforming teeth 6 to create protrusions 10 across slots 5 which prevent stator winding 22 coming out of slots 5, and it is understood the process of deforming these teeth 6 is such that deformation of teeth 6, described below, for stator winding 22 positioned in slots 5, will only be carried out once enabling this stator winding 22 to be secured in stator body 20.

FIG. 3 illustrates inventive stator 2 after carrying out the process of deformation of teeth 6 entailing the formation of protrusions 10 at their loose end 7, i.e. their end arranged on internal radial surface 3 of stator 2. In this figure, crushed bosses 11, disposed on external radial surface 4 of stator 2 in the radial prolongation of teeth 6, are evident. "Radial prolongation of a tooth" is understood to mean material of the stator which extends radially in the prolongation of a tooth towards external radial surface 4. A boss 11 forms a projection of the stator, point-like and at the end of this radial prolongation.

Such as will be described below, crushing these bosses 11 causes material of external radial surface 4 to move towards internal radial surface 3, and which allows the formation of protrusions 10 at loose ends 7 of teeth 6, due in addition to the use of suitable tooling which will be described below. As illustrated, these protrusions 10 are arranged projecting from teeth 6 so that a protrusion 10 extends at least partially across a slot 5 directly adjacent to the corresponding tooth. "At least partially" is understood to mean that a formed protrusion 10 can extend across all of slot 5 or only across a portion of said slot 5, but always at least sufficiently to enable stator winding 22 to be secured in slots 5 of stator body 20. Thus this stator winding 22 cannot move towards the interior of stator 2, thus preventing the spinning of a rotor disposed in the centre of stator 2 from being obstructed.

Stator body 20 being deformed by the use of suitable tools when stator winding 22 is held in slots 5, it is understood that at the outset the shape of stator body 20 differs from that of stator body 20 in stator 2 while the electric motor is operating. The initial shape of stator body 20 in fact differs from its final shape in that external radial surface 4 of the core of laminations has bosses which are more pronounced and in that its internal radial surface 3 does not have a protrusion 10 at teeth 6 across slots 5.

According to an embodiment, inventive stator body 20 can be implemented from a stack of laminations, forming a core of laminations. This core of laminations is then deformed via the tools which will be described below.

We will now describe in more detail the shape of a core of laminations helping to form stator body 20 in its original shape (FIG. 4), before deformation of material, and the production stages allowing stator 2 to be obtained by material deformation (FIGS. 5 to 7, and 11).

Figure 4:
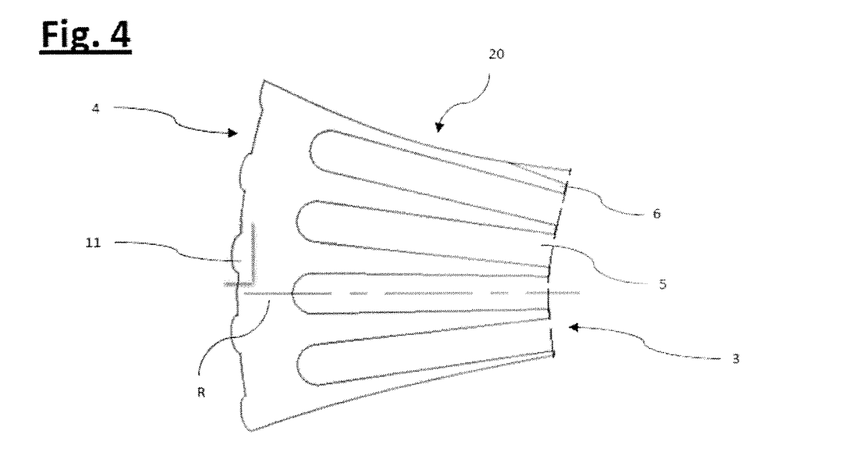
FIG. 4 is a partial schematic illustration of an inventive stator body, in a plane perpendicular to the rotational axis of the stator, similar to that of FIG. 3, showing in particular bosses arranged on the external radial surface of the stator in the radial prolongation of the teeth.

FIG. 4 is a schematic illustration of a laminated section, in which a plurality of teeth 6 separated from the adjacent teeth by slots 5 hollowed in the lamination from internal radial surface 3, is shown. The stack of laminations is implemented so that teeth 6 and slots 5 of each lamination are superimposed and thus form teeth and slots which extend axially, i.e. parallel to the rotational axis X of stator 2. The radial prolongation of teeth 6 contains a series of bosses 11 created in projections of external radial surface 4 of stator body 20. As will be described below, these bosses 11 allow material of external radial surface 4 to move towards internal radial surface 3, entailing deformation of loose end 7 of teeth 6 which they prolong radially in each case.

All teeth 6 are joined to a peripheral part of stator body 20, known as yoke. Each tooth 6 has a minimum thickness at its loose end 7 and a maximum thickness at its junction with the yoke. This is then called a trapezoidal tooth. In an alternative embodiment, each tooth can have a rectangular shape where its thickness is constant over its entire length. These bosses 11 have the shape of a flattened dome: their height, measured along the radial axis R of stator 2 is less than their width, measured over the periphery of the yoke of stator body 20. Moreover, said width of these bosses 11 does not exceed the maximum thickness of tooth 6, in the radial prolongation of which it lies.

Figure 7:
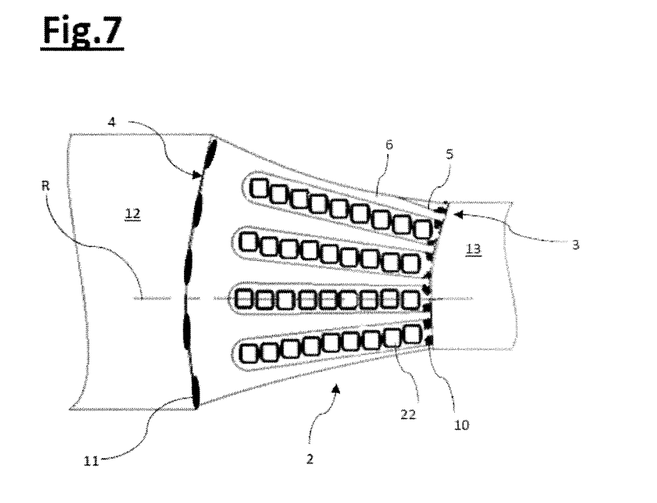
FIG. 7 illustrates, schematically, a second phase of the process of deformation of the teeth entailing the formation of protrusions at their loose end.

Advantageously, the round shape of these bosses 11 facilitates their crushing while their size ensures controlled displacement of material and centred on each tooth 6 next to each boss 11. In order to carry out the process allowing deformation of stator body 20, two tools, illustrated in particular in FIGS. 5 and 7, are necessary: an external tool 12 configured to come to lie on external radial surface 4 of stator 2 and an internal tool 13, configured to be supported on internal radial surface 3 of stator 2.

This process comprises at least two successive stages including a stage of positioning the tools, while the wires of the stator winding are disposed in all or some of the slots of the stator body and a stage of pressing stator body 20 by bringing the two tools together. These two stages are detailed below and shown in FIGS. 5 to 8.

Figure 5:
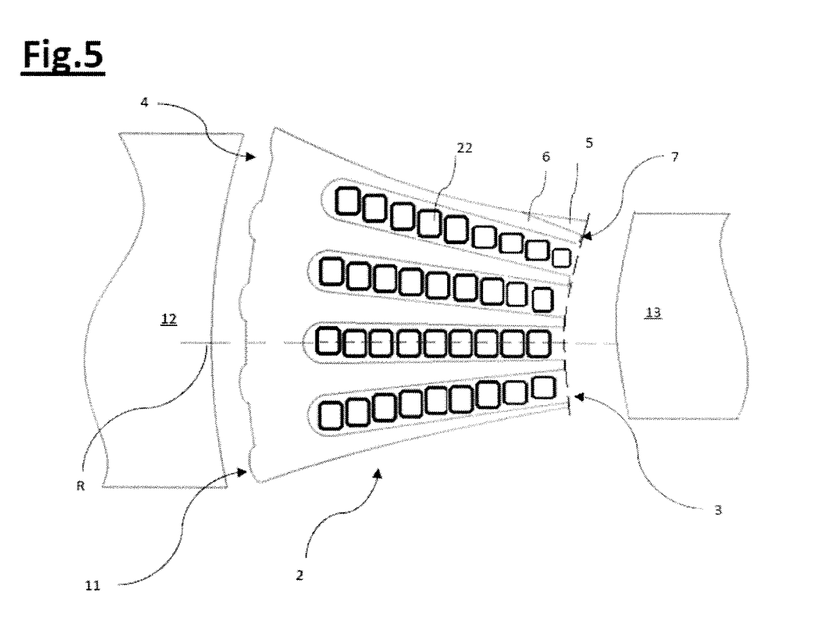
FIGS. 5 and 6 illustrate, schematically, a first stage of the process of deformation of the teeth entailing the formation of protrusions at their loose end.
Figure 6:
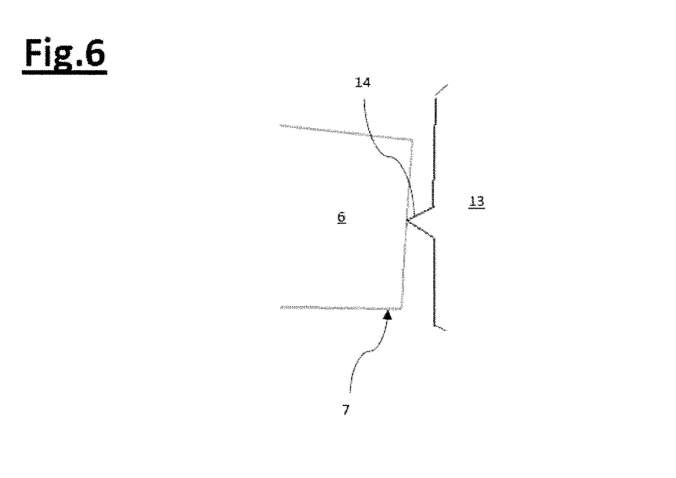

FIGS. 5 and 6 illustrate the stage of positioning the tools. Internal tool 13 is positioned in contact with loose ends 7 of teeth 6 of stator 2. This internal tool 13 is provided with points 14, shown in FIG. 6, which are placed in contact with each loose end 7 of teeth 6. Preferably, these points are centred on the surfaces of loose ends 7 of teeth 6 in order to obtain a symmetrical distribution of protrusions 10 formed by displacement of material.

Internal tool 13 can have a circular shape, thus coming to lie simultaneously on all loose ends 7 of teeth 6. Thus the stage of positioning internal tool 13 is carried out only once and this internal tool 13 then remains fixed throughout the other stages of the process.

Moreover, the positioning of this internal tool 13 allows initial temporary securing of winding elements 22 in stator body 20, before carrying out the process described.

External tool 12, in its case, is positioned on the circumference of external radial surface 4 of stator 2, next to bosses 11, as illustrated in FIG. 5. In the stage of positioning as shown in this embodiment, it is understood that the internal tool is positioned against the stator body while the external tool is positioned remotely from this stator body. Movement of the external tool, bringing it together with the internal tool, enables the external tool to be put into contact with the stator body and primarily the bosses projecting from this stator body. Thus, when carrying out said process, this external tool 12 will come to crush bosses 11, enabling material of external radial surface 4 to move towards internal radial surface 3, entailing the creation of protrusions 10 at loose ends 7 of teeth 6.

FIG. 7 schematizes this stage of the process during which pressure is exerted on stator body 20, via external tool 12, along the radial axis R from external radial surface 4 towards internal radial surface 3.

Internal tool 13 being fixed, stator 2 can be held radially, so that material of boss 11 moves towards the interior of stator body 20, in the direction of movement of the pressure exerted by external tool 12. Bosses 11 are crushed by external tool 12 and, by displacement of material of external radial surface 4 towards internal radial surface 3, protrusions 10, which take the form of beads, are produced at loose ends 7 of teeth 6.

This figure shows that these protrusions 10 enable stator winding 22 to be effectively secured in slots 5, thus preventing it from dislodging and obstructing the spinning of the rotor positioned in the centre of stator 2.

Figure 8:
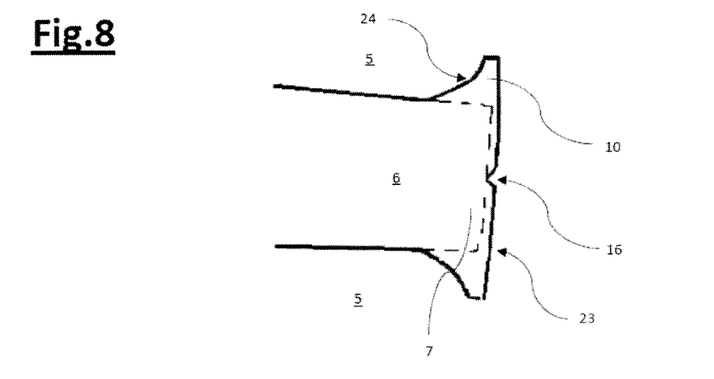
FIG. 8 illustrates, schematically, a loose end of a tooth after it has been deformed.

FIG. 8 illustrates a loose end 7 of a tooth 6, after the process of deformation of the teeth described above has been carried out. This figure illustrates by way of dotted lines regular loose end 7 of the tooth before the latter is deformed by displacement of material. Thus the effect of deformation of the tooth can be seen, namely the appearance of excess material at loose end 7 of tooth 6, in the centre of which the formation of a furrow 16 over the entire surface of tooth 6 in contact with internal tool 13 can be observed. This furrow 16 is formed following the pressure exerted by point 14 on loose end 7 of tooth 6. According to another embodiment, it is also possible to pre-form this furrow 16 in the tooth before its deformation, which enables the positioning of internal tool 13 to be facilitated by arranging this preformed furrow 16 and point 14 present on internal tool 13 face to face.

Protrusion 10 in its case is distributed in a substantially symmetrical way, on each side of said loose end 7 of tooth 6. A front face 23, having taken the shape of internal tool 13, as well as a rear face 24, whose curve is produced by a reduction in material of internal radial surface 3 towards external radial surface 4, are observed on this protrusion 10.

It is understood that in an alternative embodiment not illustrated here, it is possible to design an internal tool 13 having a bead which comes to fit in one of slots 7 surrounding a tooth 6 and which saves the use of material on a side of tooth 6, so that displacement of material, obtained following deformation of tooth 6, is unilateral.

Bosses 11, whose crushing is behind displacement of material of external radial surface 4 towards internal radial surface 3, can be positioned at several levels depending on the securing degree desired. Several parameters can be modified: the number of bosses 11 next to each tooth 6, the number of laminations on which bosses 11 extend next to each tooth 6, the number of teeth 6 next to which bosses 11 are disposed and also the quantity of material used to create these bosses 11.

A first arrangement consists in positioning bosses 11 over the entire external radial surface 4 of stator body 20, i.e. over the whole axial dimension of the latter, and next to each tooth 6. If this arrangement has a maximum degree of securing stator winding 22 in the slots of the stator body, it is understood that other less expensive types of arrangements which are not so costly in material and thus lighter and cheaper in manufacture can be produced.

It is possible that bosses 11 in particular do not extend over the entire height, i.e. the axial dimension of the stator body and can be placed on a defined number of laminations. Consequently an embodiment could be considered according to which several bosses 11 may be arranged next to each tooth 6 over one another along the axial direction of stator 2, each boss 11 being positioned on a defined number of laminations. This system can have a securing degree equivalent to the above embodiment, considerably decreasing the quantity of material used for manufacturing stator 2.

It is also perfectly possible to position bosses 11 only next to one of two teeth 6. Each boss 11 allows the creation of a protrusion 10 extending in each adjacent slot 5 of deformed tooth 6. By virtue of this arrangement, all slots 5, at least partially, will be crossed by a protrusion 10, while the quantity of material used for the creation of bosses 11 is at least halved compared to the two above embodiments.

Figure 9:
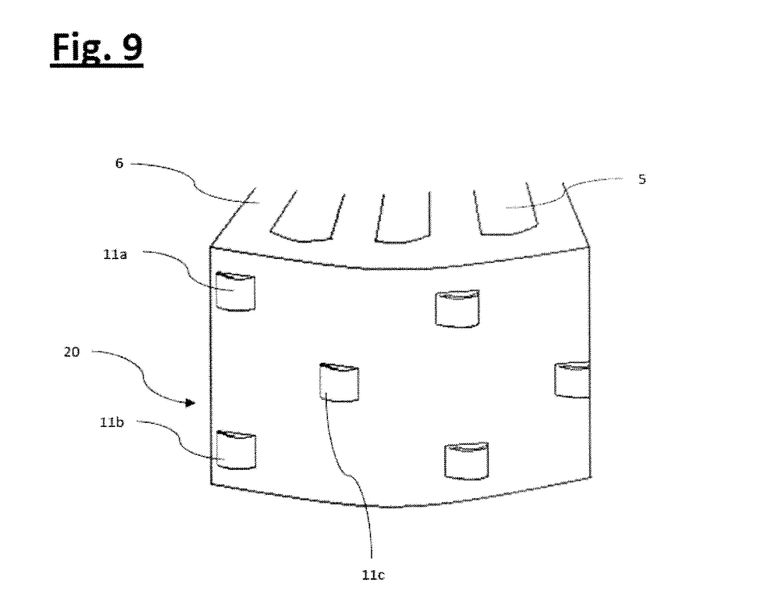
FIGS. 9 and 10 are perspective views of the respective external and internal radial faces of the stator, after carrying out the process of deformation of the teeth entailing the formation of protrusions at their loose end.
Figure 10:
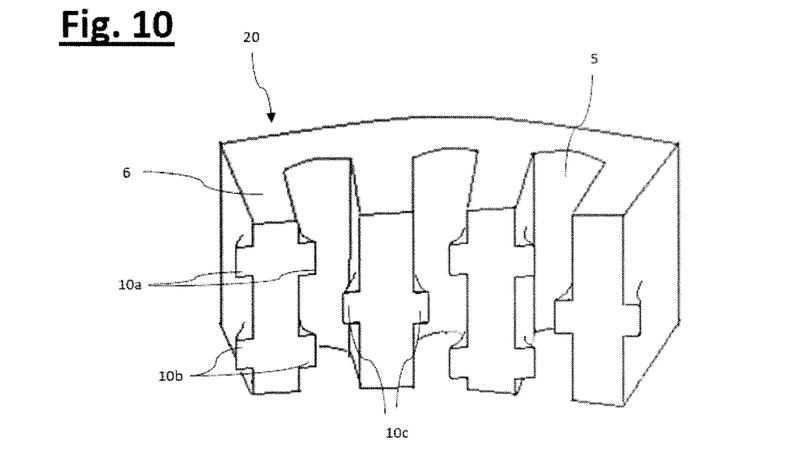

According to a particular embodiment illustrated in FIGS. 9 and 10, and which consists of a combination of the alternatives shown above, the choice of creating bosses 11 on external radial surface 4 so as to form a staggered pattern will be possible. As shown in FIG. 9, the bosses are disposed in alternation, with two bosses 11a and 11b arranged axially next to the same first tooth 6, then only one boss 11c next to following tooth 6 and so on. Protrusions 10 formed after carrying out the process described above are illustrated in FIG. 10 and are numbered 10a to 10c, each letter used to indicate bosses 11 being re-used to indicate corresponding protrusion 10.

By virtue of this embodiment, securing at the opposite axial ends of stator 2 is achieved for each slot but also securing centrally, thus decreasing the quantity of material used to create protrusions 10.

Bosses 11 could also have varying thickness. According to the thickness of boss 11 chosen, and thus the excess quantity of material of stator body 20 envisaged at the outset, protrusion 10 obtained after displacing material at loose end 7 of tooth 6 located in the prolongation of said boss 11, is larger or smaller, which enables the filling level of slots 7 to be adjusted and thus the degree of securing winding elements 22 inside stator body 20.

Additional details will now be given on the process of deformation of the stator body in order to obtain an inventive stator enabling the stator winding to be secured in the stator body, with reference in particular to FIG. 11, which is a schematization of two embodiments varying from the same process of deformation of teeth 6, allowing protrusions 10 to form at their loose ends 7.

According to a first embodiment, stator winding elements 22 are first wound around teeth 6 of stator body 20. Subsequently, circular internal tool 13 is positioned against the stator body, at loose ends 7 of teeth 6, covering all internal radial surface 3. External tool 12 is then positioned remotely from external radial surface 4 of stator body 20, then pressure is exerted on stator body 20 by moving this external tool 12, along the radial axis R, towards fixed internal tool 13, in order to allow displacement of material, in the direction of movement of said external tool 12, as described above. External tool 12, in this example, not covering all external radial surface 4, the exertion of pressure by external tool 12 along the radial axis R must be repeated several times ensuring, between each application of pressure, that external tool 12 is moved along the rotational axis A, as illustrated in FIG. 11. It should be noted that this figure is only one schematization and that it is entirely possible to design an external tool 12 enabling more than two bosses 11 to be covered at the same time, contrary to what is shown in said FIG. 11.

According to a second embodiment, in which the first stages remain identical to those of the embodiment mentioned above, stator 2, associated with internal tool 13, will be moved along a rotational axis B, rather than external tool 12. Again it should be noted that this figure is only one schematization and that it is entirely possible to design an external tool 12 enabling more than two bosses 11 to be covered at the same time, contrary to what is shown in said FIG. 11.

Figure 11:
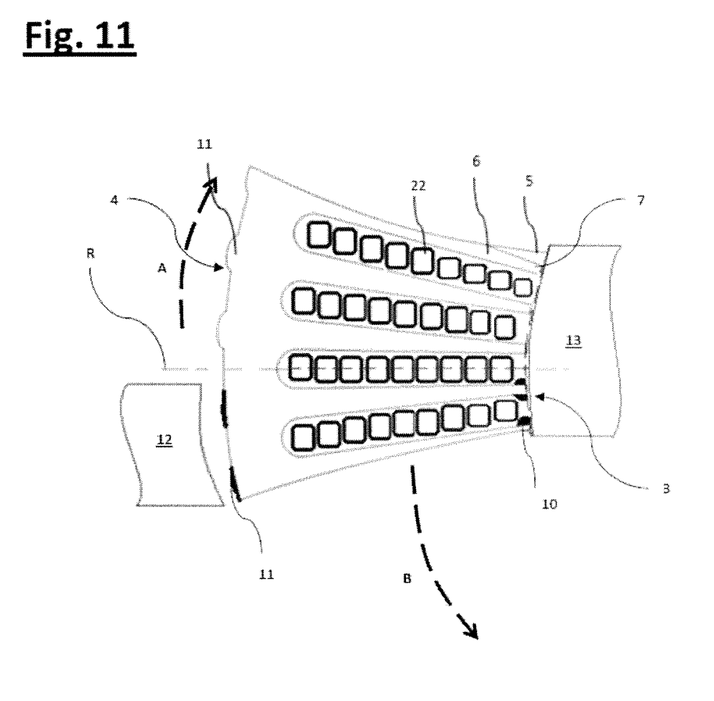
FIG. 11 is a schematization of two embodiments which are different from the process of deformation of the teeth entailing the formation of protrusions at their loose end.

Whatever the embodiment chosen, protrusions 10 are thus formed as required and are therefore only shown in FIG. 11 next to bosses 11 having been crushed by external tool 12.

It is understood that the tangential dimension of external tool 12 must offer a compromise between its capacity to be positioned in the centre of the bosses, in order to ensure displacement of radial material, and the multiplicity of actions to be carried out. In fact, too long an external tool 12 would be likely to generate unequal pressure on external radial surface 4 of stator 2, due to its circular shape, and thus protrusions 10 also being unequal, then risking no longer being able to secure winding elements 22 in an optimum way. On the other hand, too short an external tool 12, which would allow precise positioning next to each boss 11, would generate too great a number of operations for the technicians in charge of carrying out the process. It is thus important to find, for this external tool 12, a dimension offering a compromise between these two constraints.

The process thus described, by displacement of material of external radial surface 4 towards internal radial surface 3, therefore enables protrusions 10 to be obtained, ensuring the securing of winding elements 22 positioned in stator body 20. Stator winding 22 thus secured in said stator body 20 can then no longer be dislodged and therefore cannot obstruct the spinning of the rotor disposed in stator 2.

Moreover, in this process, after stator winding elements 22 have been positioned in not deformed stator body 20 the means of deformation are only carried out once enabling these stator winding elements 22 to be secured. These are thus secured, without any obstacle to their insertion into slots 5 being generated.

This advantage is obtained by a specific design of stator body 20. The latter has, in its original shape, areas of excess material allowing, by material deformation towards the desired areas, creation of protrusions 10 which ensure that stator winding elements 22 are secured. This design thus enables stator winding elements 22 to be wound around teeth 6 of stator body 2, which are not deformed before carrying out the process of deformation, and therefore said stator winding elements 22 to be secured. Thus, stator winding elements 22 are securely held in stator body 20, preventing them from obstructing the spinning of the internal rotor, but not being deformed or damaged to allow their insertion. Moreover, as the original shape of stator body 20 does not have any protrusion the filling rate of a slot 5 can be increased, allowing the insertion of a winding 22 whose width corresponds to the width of slot 5. In addition when the rotary electric machine is operating, protrusions 10 created by deformation allow the magnetic performance of said machine to be improved while replacing the teeth roots of a traditional rotary electric machine of the prior art.

The invention however would not be limited to the means and configurations described and illustrated here and it also extends to all equivalent means or configurations and any technically operative combination of such means. In particular, the stages of carrying out the process, as well as the positioning of bosses 11 on the external wall of the core of stacked laminations can be modified without harming the invention, insofar as they fulfil the functionalities described in this document.

The invention claimed is:

1. A rotary electric machine stator comprising:
    a stator body; and
    a stator winding supported by the stator body,
    wherein the stator body is formed by a core of stacked laminations and extends around an axis while being delimited by an internal radial surface and an external radial surface,
    said stator body having a plurality of teeth formed respectively between two slots arranged in said stator body from the internal radial surface and extending axially to receive at least one stator winding element, so that along the circumference of the rotary electric machine stator the latter has an alternation of slots and teeth,
    wherein the plurality of teeth comprise at least one deformed tooth having, at a loose end helping to define the internal radial surface of the rotary electric machine stator, at least one protrusion extending across at least one adjacent slot, said protrusion being obtained by material deformation of said deformed tooth,
    wherein said protrusion is formed by a bead resulting from displacement of material in the deformed tooth, from the external radial surface of the rotary electric machine stator towards the internal radial surface of the rotary electric machine stator, and
    wherein two successive teeth of the plurality of teeth have protrusions arranged at different axial positions along the circumference of the rotary electric machine stator.
2. The rotary electric machine stator according to claim 1, wherein the loose end of the deformed tooth comprises the protrusion extending on either side of the tooth, across each directly adjacent slot of said deformed tooth.
3. The rotary electric machine stator according to claim 1, wherein the loose end of the deformed tooth has on the internal radial surface of the rotary electric machine stator a furrow forming a point-like or straight entry, centered in relation to the thickness of the tooth defined as the dimension between the two successive slots surrounding said tooth.
4. The rotary electric machine stator according to claim 1, wherein each tooth of the plurality of teeth is a deformed tooth which comprises at a loose end at least one protrusion obtained by radial deformation.
5. The rotary electric machine stator according to claim 1, further comprising at least one boss which is crushed on the external radial surface in the radial prolongation of the deformed tooth.
6. The core of laminations stacked axially over one another so as to form the stator body of the stator according to claim 5, wherein the at least one boss, projecting from the external wall of said core of laminations corresponding to the external radial surface of the stator body, is created.
7. The core of laminations according to claim 6, wherein the at least one boss extends axially over a defined number of laminations of the core of laminations.
8. Tools for obtaining the rotary electric machine stator according to claim 1 by deformation of the core of laminations stacked axially over one another to form the stator body, the tools comprising an internal tool brought into contact with the loose end of the teeth of at least one lamination of the core of laminations; and an external tool brought into contact with the external wall of at least one lamination of the core of laminations, the external tool having a regular profile, configured to systematically lie on the circumference of the core of laminations and on at least one boss.
9. The tools according to claim 8, wherein the internal tool has at least one point, the internal tool being positioned so that this point is in contact with a loose end of a tooth of a lamination of the core of laminations.
10. A process for obtaining the stator according to claim 1, comprising:
    inserting the stator winding elements into the slots arranged in the core of laminations; and
    deforming material of the core of laminations by pressing at least one boss on the external wall of the core of laminations, via an external tool and an internal tool which move in relation to one another, while the stator winding elements are placed in their respective slots, so as to create a protrusion at an opposite end of the external wall of the core of laminations, across the slots.
11. The process according to claim 10, further comprising, as part of the deforming, positioning an internal tool against the loose end of the teeth, the internal tool also preventing the stator winding elements from passing outside the slots; moving an external tool against the external wall of the core of laminations in the direction of the internal tool remaining fixed; and bringing the tools together.
12. The process according to claim 10, further comprising applying an electric insulation member against the body of the stator, prior to inserting the stator winding element(s) into the stator body.
13. A rotary electric machine comprising at least one of the rotary electric machine stators according to claim 1.

* * * * *